N. W. Wheeler,

Piston Valve.

Reissued Oct. 12. 1869.

No. 3671.

Witnesses;

S J Gordon

Thomas J Baldwin

N. PETERS, PHOTO-LITHOGRAPHER, WASHINGTON, D. C.

UNITED STATES PATENT OFFICE

OSCAR T. EARLE, OF NORWALK, CONNECTICUT, ASSIGNEE OF NORMAN W. WHEELER.

METHOD OF OPERATING STEAM-VALVES.

Specification forming part of Letters Patent No. 13,369, dated July 31, 1855; antedated March 1, 1855; extended seven years; reissue No. 3,671, dated October 12, 1869.

*To all whom it may concern:*

Be it known that NORMAN W. WHEELER, formerly of Cincinnati, in the State of Ohio, did invent certain new and useful Improvements in Steam-Engines, Relating to the Construction and Operation of the Valves thereof; and that the following, taken in connection with the drawings, is a full, clear, and exact description thereof.

Figure 1:
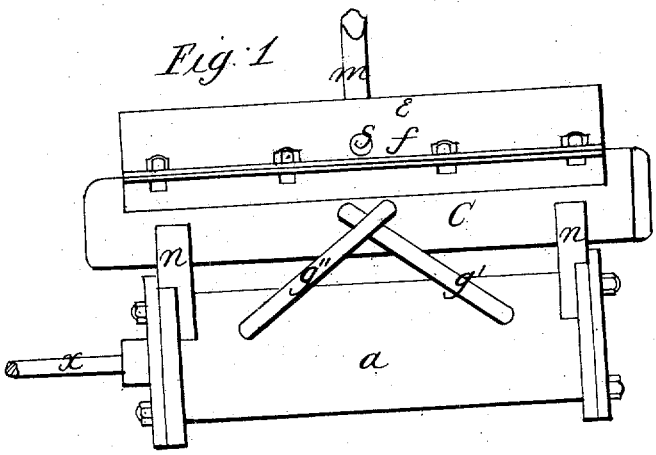
Figure 3:
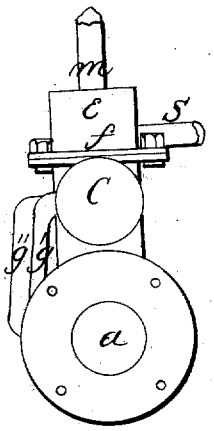
Figure 2:
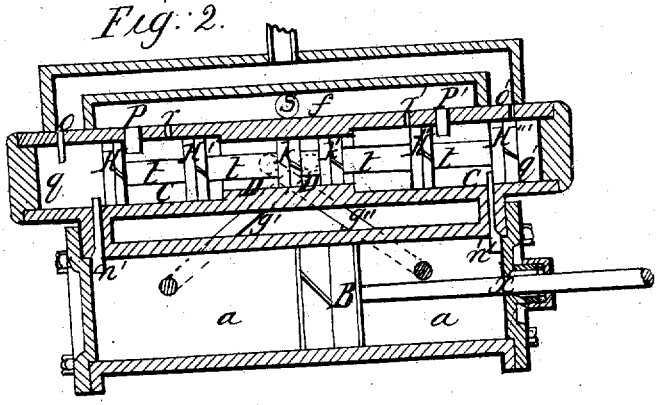

In the drawings, Figure 1 is an elevation of a steam-cylinder and valve-chest constructed according to the principles of this invention. Fig. 2 is a vertical section through the same, and Fig. 3 is an end elevation thereof.

These improvements are chiefly useful in engines working without a fly-wheel, but may be used in connection with any form of steam-engine.

Prior to the date of his invention, the valves of steam-engines have been worked without any valve-gear, and, by means of a connection with pistons actuated by steam derived from the boiler, the entrance and escape of the steam actuating such pistons being controlled by a small valve, moved by a proper train of mechanism—a valve-gear, in fact, deriving motion from the main piston-rod. Prior to the date of his invention, also, valves have been arrested, or their motion stopped, by means of water-and-air dash-pots or cushions. Therefore, although he moved valves by steam acting upon pistons, and arrested the motion of valves by means of a steam-cushion, neither of these points are claimed broadly; but he was the first to actuate steam-valves by means of pistons, which latter were operated by steam taken from the working-cylinder. He was also the first who used the main piston to govern the entrance of steam which operated valve-working pistons. He was also the first who arranged valves and their operating-pistons upon the same rod, in such manner that no stuffing-box was interposed between the valves and the pistons; and, also the first who arranged a steam-cushion, or the piston and pocket which inclose steam, in such relation to the valve that there is no stuffing-box between the valve and the cushion.

In the drawing, the main or working-cylinder is shown at *a a*, the piston at B, the piston-rod at *x*, the steam side-pipe at *e*, the exhaust side-pipe at *f*, the passage connecting with the boiler at *m*, and that leading to the condenser or the open air at S. The ports leading into the cylinder are shown at *n'*, and two passages, leading from the cylinder to the valve-chest, at *g' g''*. The valve-chest itself is represented at C C, D D; and this chest has two connections—at *o o'* with the steam side-pipe and fan, at P *r* P' *r'* with the exhaust side-pipe. I prefer to make the valve-chest cylindrical throughout, and to use ordinary piston-valves, such as H H'''; and upon the same spindle or stem, *t t t t*, on which these valves are mounted I prefer to mount the valve-moving pistons H' H''. Between the valve-moving pistons I arrange secondary pistons K K'. In the position of the parts shown in the drawings, the piston-rod is moving outward, steam is entering through *m*, passing through E and O, also through *n*, and pressing upon the piston B, on that side thereof furthest from the stuffing-box. The steam which is around the piston-rod is escaping through *n'* into the valve-chest, between the pistons H'' and H'''; thence through the aperture P' into the escape side-pipe *f*, and finally through *s*. The spindle and the valves and pistons have been brought to rest by the extreme end of the valve H''' having passed over the opening *o'*, steam being thus trapped in the pocket *q'*, formed by the right-hand end of the valve-chest, Fig. 2, thus forming a steam-cushion, the elastic force of which is prevented from moving the piston and spindles by the steam-pressure acting upon the left side of H. Steam is entering the passage *g'*; but as that passage, in the present position of the spindle, opens between the two pistons K K', this steam does not disturb the position of the spindles and valves.

When the main or working piston has traveled so far to the right that steam enters *g''*, this steam passes into the valve-chest between H' and K, which are of unequal diameters; and as the pressure upon the outsides of valves H and H''' is nearly balanced, the valve-stem moves immediately to the left, and while so doing H moves over $n$, closes the communication between the cylinder and $o$, shuts steam off from that side of the piston, and makes a connection between $n$ and $p$ into the exhaust-pipe. While thus moving, the stem carries H''' over $n'$, thus admitting steam through $o'$ $r'$ upon the right side of the piston, and closing the communication between $n$ and $n'$, and the main piston now moves to the left. The stem-valves and pistons continue to move, after $k$ has closed the opening of $g''$ into the steam-chest, by reason of the expansion of the steam contained between H' and K, and this steam exhausts through $r$, when H' has passed over $r$, and before its motion is arrested. The stem-valves and pistons are arrested in their movement to the left by the extreme end of H passing over $o$ and trapping steam in the pocket $q$. The position of the openings of $g'$ $g''$ into the main cylinder must be regulated so that the valves shall open and close the ports when the main piston is near the ends of the stroke.

By inspection of the drawings, and consideration of the description, it will be perceived, first, that steam from the main working-cylinder actuates the valve-working pistons; second, that the main piston governs the entrance or admission of the steam to operate the valve-working pistons—acts, in fact, as the steam-valve for those pistons; third, that the valve-working pistons are connected to the valves without any stuffing-boxes between them—that the valves and pistons are on one spindle or stem in one chest; fourth, that the pockets and valves are so arranged that the valves are cushioned by steam, without any separate dash-pot or any stuffing-box between the valve and the pocket or dash-pot; fifth, that there is no valve-gear of any kind to operate either the main or secondary valves.

What is claimed, and desired to be secured, is—

1. Connections or passages leading from a main cylinder to a cylinder inclosing valve-moving pistons, whereby steam is admitted from the main cylinder so as to act upon valve-moving pistons, substantially as described.

2. In combination with passages leading from a main cylinder to a cylinder containing valve-moving pistons, a main piston acting, substantially as described, as a valve to open and close such passages, the construction being as described.

3. Combining valve-moving pistons and valves, substantially as described, so that no stuffing-boxes intervene between the valves and the pistons which operate them.

4. Mounting valves and valve-moving pistons upon the same spindle or stem, as described.

5. Piston-valves, in combination with valve-working pistons, and a cylindrical chamber containing them, substantially as set forth.

6. A pocket or recess, closed by a piston, so as to arrest the movement of a valve and valve-spindle, the pocket communicating directly with the valve-chest in which the valve slides, and there being no stuffing-box between the valve and the pocket.

OSCAR T. EARLE.

Witnesses:
THOMAS J. BALDWIN,
GEO. H. COLLINS.